Patented May 16, 1944

2,349,211

UNITED STATES PATENT OFFICE 2,349,211

ALKYLATION PROCESS

Anton Johan Tulleners, Long Beach, Calif., assignor to Shell Development Company, San Francisco, Calif., a corporation of Delaware No Drawing. Application October 11, 1941,
Serial No. 414,690

6 Claims. (Cl. 260—683.4)

This invention relates to the alkylation of organic compounds by reaction with normally liquid olefines in the presence of an alkylation catalyst. It deals particularly with a novel method for carrying out such reactions whereby the life of the alkylation catalyst may be increased and the yield and quality of the alkylation products may be improved.

Alkylations with normally gaseous olefines have achieved great commercial importance but, although it has been demonstrated that similar reactions may be effected with the higher boiling olefines, very little industrial scale application has been made of the latter reactions because it has been found that the life of alkylation catalysts is very short when such alkylating agents are used. It is an object of the present invention to overcome this and other disadvantages of prior methods of alkylating with normally liquid olefines, including polymers of the normally gaseous olefines.

For the purpose of making the invention more clear it will be described with special reference to the alkylation of isoparaffins with olefine polymers in the presence of sulfuric acid alkylation catalysts. This application of the invention has been chosen to illustrate its principles not only because of its great potential commercial importance but also because it is a reaction which heretofore has presented especially great difficulty. It will be understood, however, that the invention is not limited to this reaction but may be applied to the alkylation of other compounds with other liquid olefines using other catalysts as will be more fully described hereinafter.

It has been thought that the poor quality of products and the short catalyst life heretofore obtained when alkylating with olefine polymers were due to the polymers themselves which tended under alkylating conditions to undergo side reactions which cause rapid loss of activity of alkylation catalysts. If this were true there would be little chance of economically using polymers for alkylation. Others have suggested, however, that the short life of alkylation catalysts in the presence of polymers is not due to the polymers themselves but to poisoning of the catalyst by the sulfur compounds which usually contaminate these polymers. It has now been found, however, that alkylation catalysts may still lose their activity relatively quickly and give products of poor quality even when the polymers used are preliminarily treated for complete or substantial removal of sulfur compounds. It has further been discovered that the poor results heretofore obtained in alkylating with olefine polymers are due to the presence in the polymers of certain active oxygen-containing compounds. Although the exact structure of these undesirable oxygen-containing compounds is not yet fully known, there is good reason to believe that they are of the peroxide type and it seems probable that they are polymers which have added oxygen at an olefinic bond to form the group

However that may be, it has been found that polymers with a low peroxide number are highly advantageous alkylating agents and do not show the undesirable features previously associated with polymers in alkylation. Therefore, these undesirable oxygen-containing compounds will be hereinafter referred to as "peroxides" whatever their chemical structure.

Based on these discoveries, a commercially practical method for efficiently and economically carrying out alkylations with olefine polymers has been developed. The process of the invention comprises alkylation of an organic compound by reaction with an olefine polymer in the presence of an alkylation catalyst but in the substantial absence, or at least less undesirable amounts, of the previously described "peroxides." The presence of these "peroxides" in the olefine polymers used may be determined by various methods. One of these methods of quantitative determination of "peroxides" in polymers is described by Yule and Wilson in "Industrial and Engineering Chemistry," vol. 23, pages 1254–59 (1931). Their method is based on the fact that organic peroxides oxidize ferrous ions to ferric ions which may be determined by titration with a 0.01 N titanous chloride solution. The result may be expressed in gram equivalents of active oxygen per 1000 liters of polymer which is termed the "peroxide number" of the polymer. For alkylation in the presence of sulfuric acid catalysts, according to the present invention, it is preferred to use polymers having a peroxide number of less than 10 and most preferably less than about 3. With less active alkylation catalysts such, for example, as phosphoric acid and the like, it is possible to use polymers of higher peroxide numbers but in all cases it is preferred to carry out the reaction with polymers containing as little "peroxides" as feasible.

The invention may be advantageously applied to alkylations with a wide variety of products of polymerization. Thus, either copolymers, such as addition products of one olefine with itself, or interpolymers, such as addition products of one olefine with a different olefine, or mixtures of copolymers and interpolymers may be used. Advantageous methods of producing copolymers which may be employed in the process are described, for example, in U. S. Patents 2,007,160 and 2,142,937 while preferred procedures for copolymerization of olefines are disclosed in U. S. Patents 2,171,928 and 2,174,247. The polymers obtained by either the catalytic or the thermal polymerization step of U. S. Patent 2,171,207, or both, are suitable starting materials for the present process as are also the polymerization products obtainable by the methods of U. S. Patents 2,055,415 and 2,076,201 for further example. The polymers may be used for alkylation in the form of the crude mixtures resulting from the polymerization treatment and containing unreacted olefine and/or other components of the feed to the polymerization unit, or products of fractionation and/or refining of such mixtures may be employed. Thus, for example, the products of polymerization may be distilled to separate only unpolymerized components prior to use of the polymers for alkylation, or the polymerization products may be further fractionated to separate polymers of narrower boiling range for use as the alkylation agent. Typical olefines which may be used as starting materials for the preparation of the polymers are, for example, ethylene, propylene, alpha and beta butylenes, isobutylene, the amylenes, cyclopentene, cyclohexene, methyl cyclohexene, and higher homologues and suitable substitution products thereof such as halogen, particularly chlorine, substitution products. Instead of the olefines themselves, the corresponding alcohols, for example, may be used in the preparation of the polymers.

The alkylation of isoparaffins with olefine polymers may be carried out in the presence of sulfuric acid in the same way and under the same conditions as alkylations with the corresponding olefines. Particularly suitable procedures are described, for example, in U. S. Patents 2,211,747 and 2,232,674 but other methods of batch, intermittent or continuous operation may also be used. Most preferably, however, the reaction is carried out in the liquid phase at temperatures between about 0° C. and 50° C. with sulfuric acid of about 88% to about 110%, most preferably 90% to 99%, concentration. It is desirable to use a substantial stoichiometric excess of isoparaffin to polymer, preferably at least 6 mols of isoparaffin per mol of olefine in the feed, and to carry out the reaction under conditions such that 30 to 100 or more mols of isoparaffin are present per mol of olefine polymer in the reaction mixture. Under these conditions a wide variety of different tertiary aliphatic carbon atom-containing compounds may be successfully reacted with polymers of reduced "peroxide" content. For example, isobutane, isopentane, isohexane, 2,2,5-trimethyl hexane, methyl cyclopentane, methyl cyclohexane, para dimethyl cyclohexane and the like may be alkylated either singly or in admixture, with or without other compounds which may be inert under the reaction conditions or which may undergo simultaneous alkylation or other reaction which does not interfere with the process.

A number of different methods are available for carrying out alkylations with polymers in the absence of "peroxides" according to the invention. The process may be carried out under conditions at which the formation of the described "peroxides" is avoided, inhibited or at least greatly diminished, thereby increasing the effective life of the alkylation catalyst and the yield and quality of the alkylation products, or the same results may be achieved by removing, destroying or decomposing the "peroxide" content of the polymer before it is contacted with the alkylation catalyst. It has been discovered that olefine polymerization products when freshly prepared contain little or no "peroxides," but that these catalyst-poisoning oxygen-containing compounds are formed in the olefine polymers upon standing. The rate of peroxide formation depends upon the olefine polymer or polymers involved and the conditions of storage before use in alkylation. Thus, under the same conditions, the di-isobutylenes form the described peroxides at a slower rate than, for example, the octylenes produced by interpolymerization of various olefines in the presence of phosphoric acid on a solid carrier. The undesirable "peroxides" form especially readily in olefine polymers when subjected to the influence of light and oxygen or oxygen-containing gas, such as air. The relatively higher boiling polymerides in particular are found to contain substantial quantities of peroxides when exposed to light and/or oxygen for more or less prolonged periods of time.

One method of inhibiting such peroxide formation is by addition of a small amount of an anti-oxidant, preferably a phenolic compound such as a naphthol, a tertiary alkyl phenol or cresol, for example tertiary butyl phenol or cresol, the polyhydroxy phenols or cresols such as resorcinol, and the like. The effectiveness of compounds of this type in preventing peroxide formation in polymers during storage is shown by the following results obtained with a heart cut of purified and vacuum-distilled trimers produced by interpolymerization of isobutylene and secondary butylenes in the presence of hot sulfuric acid. The polymer, having a peroxide number of about 0.05, was divided into different portions which were stored in the presence of air.

| Storage conditions | Peroxide number after storage |
| --- | --- |
| Without inhibitor in open container in light | 6.8 |
| With 0.003% hydroquinone in dark | 0.22 |
| With 0.003% α-naphthol in dark | 0.12 |
| With 0.003% catechol in dark | 0.05 |

The saving in catalyst consumption effected by alkylation with polymers having a peroxide number of the order of 0.05 to 0.22 instead of with the polymer stored as usual without inhibitor is very material and may reduce the cost of catalyst by half or more as will be seen from the following results of alkylation of isobutane with interpolymers of isobutylene and secondary butylenes. The interpolymers were used promptly for alkylation in one case so that their "peroxide" content was low, while in the other case normal storage with resulting undesirably high "peroxide" formation took place before reaction. In both cases the alkylation was effected by feeding the isobutane and polymer into a circulating stream of an emulsion of sulfuric acid and reacted hydrocarbon from which emulsion was continuously withdrawn to a separator. Separated hydrocarbon was distilled for recovery of alkylate while the acid phase from the separator was returned to the reaction after withdrawal of a part which was replaced by fresh 98% sulfuric acid. The reaction conditions were:

| | | |
|---|---|---|
| Peroxide number of polymer | 2.6 | 11.6 |
| Isobutane to polymer molar ratio | 13.1 | 13.5 |
| Isobutane concentration in the feed per cent by volume | 82.0 | 84.5 |
| Temperature °F | 40 | 40 |
| Vol. of acid per vol. of hydrocarbon in reaction zone | 1.1 | 1.1 |
| Vol. of recycled hydrocarbon mixed with unit vol. of hydrocarbon feed | 14.8 | 14.4 |
| Average contact time min | 19.6 | 19.1 |
| Concentration of withdrawn sulfuric acid per cent | 90–88.5 | 89.5–88.5 |

The following results were obtained:

| | Alkylation with fresh polymer of 2.6 peroxide number | Alkylation with usual stored polymer of 11.6 peroxide number |
|---|---|---|
| Vol. of alkylate produced per vol. of polymer fed | 1.92 | 1.78 |
| Vol. of alkylate produced per vol. of acid used | 15.4 | 9.9 |
| Bromine No. of light alkylate | 0.38 | 0.71 |

These results show that by inhibiting the formation of "peroxides" in the polymers they not only give more than 50% increase in the life of the catalyst in alkylation but also give an increased yield of alkylate of 14%. Also, the light fraction of the alkylate obtained with polymers of low peroxide number is of better quality than that normally produced since it contains less than half as much unsaturated material. The results also show that peroxide formation in the polymers can be inhibited and improved alkylation results obtained by feeding polymers to the alkylation unit immediately or at least soon after their formation or production. In the alternative, products of polymerization may be maintained out of contact with oxygen and/or protected from light during the period elapsing between their production and use as alkylation agents and improved alkylation results obtained as a result of the reduction of the peroxide formation. As a rule, however, it is preferred to protect the polymers during storage with small amounts of inhibitors as previously described because of the greater improvement thereby obtainable.

Instead of, or in addition to, the foregoing methods of inhibiting peroxide formation in the polymers used for alkylation, the polymers may be treated to remove the active oxygen-containing compounds present therein prior to the alkylation step of the process. One method of effecting such removal prior to alkylation is by distillation, preferably under non-oxidizing conditions as under vacuum or in the presence of a non-oxidizing gas, for example hydrogen or nitrogen. Thus, it has been found that the relatively higher boiling polymers, particularly those boiling above about 115° C. to 125° C., have a greater tendency to contain and/or form the undesirable "peroxides" as compared to polymers of lower boiling range. Thus, as a non-limiting example, a polymer obtained by polymerization of a butane-butylene fraction of cracking gases with a phosphoric acid catalyst was fractionated. It was found that, after exposure to light and air for a given time, the peroxide content of polymers boiling above about 240° F. (115° C.) was, on the average, between 6 and 12 times greater than that of the lower boiling fraction which had a peroxide number of about 0.7 to 1, thus showing, as indicated above, that materially longer catalyst life and improved yield may be obtained by removing the heavy ends in which the peroxides are concentrated before alkylating with the thus-purified polymer. It is preferred to effect the alkylation with the polymer substantially immediately after the distillation in order to inhibit further "peroxide" formation. Another method of removing peroxides from polymers prior to alkylation is by reaction with reducing agents. Sodium bisulfite is a suitable reducing agent for this purpose but other agents such as oxalic acid-sulfuric acid mixtures and the like may also be used. Most advantageously the polymer is fractionated to separate a cut of low peroxide content and only the fraction in which the peroxides are concentrated is treated to destroy or remove these undesirable components after which the treated material is preferably redistilled before being fed to the alkylation reaction. In this way substantially the entire polymer may be efficiently used as alkylation agent, yet long catalyst life and high yields of high quality products are obtained.

It will be seen that the process of the invention offers many advantages over prior methods of alkylating isoparaffins and the like in the presence of sulfuric acid catalysts. By the use of olefine polymers instead of the corresponding olefines it is possible to carry out the alkylation with higher concentrations in the alkylation mixture of the isoparaffin being alkylated than is usually feasible when alkylating with olefines because the latter are generally associated with normal paraffins having so nearly the same boiling point that separation is impractically expensive. The presence of such diluents in the alkylation mixture results in the production of alkylation products of poorer quality and gives shorter alkylation catalyst life, these undesirable effects increasing linearly as the diluent content of the feed is increased to about 40% by weight. Polymerization of the olefines offers a simple method of separating the undesirable paraffins now that the present invention provides a suitable procedure for alkylation with the resulting polymers. The invention is not limited to alkylations carried out with polymers, however, since the advantages of longer catalyst life and improved yield and quality of isoparaffin alkylation products are also obtained when alkylating with other normally liquid olefines in accordance with the new procedure. Thus, alkylations with normal and/or iso-amylenes, hexylenes and heptylenes, both normal and branched chain or other olefinic fractions or components of cracked gasoline or higher boiling unsaturated hydrocarbons which tend to form "peroxides," or mixtures of such hydrocarbons are materially improved by carrying out the process in a manner similar to that described for alkylation with polymers.

While the invention has been described with special reference to alkylations in the presence of sulfuric acid, it will be understood that the process is not limited thereto as similar, and in some cases even relatively greater, advantages may be obtained when using other alkylation catalysts such as chlorosulfonic, fluorosulfonic, hydrofluoric and hydrofluoroboric acids and like acid catalysts. Other alkylation catalysts which may be used in the process include Friedel-Crafts type catalysts such as aluminum chloride or suitable complexes or solutions thereof as, for example, aluminum chloride-kerosene or other organic complexes or aluminum chloride-sodium chloride or like inorganic complexes or mixtures of aluminum chloride with antimony trichloride or the like. Thus, the process may be carried out with liquid alkylation catalysts which may or may not be deposited on carriers or supports. The alkylation conditions must, of course, be modified in accordance with the nature of the catalyst chosen.

The invention is likewise not limited to the alkylation of open and closed chain paraffins having a tertiary carbon atom but may also be applied to the alkylation of other alkylatable compounds such, for example, as aromatic hydrocarbons such as benzene, toluene, naphthalene, etc. and substitution products thereof such as phenols, cresols, aniline, nitrobenzene, halobenzenes, and the like. It will thus be seen that the invention is of wide applicability and is not restricted to the examples mentioned by way of illustration nor by any theory suggested in explanation of the improved results obtained.

I claim as my invention:

1. A process of alkylating an isoparaffin by reaction with an olefin polymer in the presence of an acid alkylation catalyst in the liquid phase which comprises treating a mixture of olefin polymers containing sulfur compounds and having polymers boiling above about 115° C. and lower boiling polymers present therein to remove sulfur compounds therefrom, distilling the treated polymer to separate therefrom a polymer fraction boiling below about 115° C. characterized by being substantially free from peroxides and a fraction of higher boiling polymer characterized by having a substantial amount of peroxides present therein, feeding said lower boiling polymer to an isoparaffin alkylation unit, treating said fraction of higher boiling peroxide-containing polymer with sodium bisulfite to substantially reduce the peroxide content thereof, adding a polyhydroxy phenol to the thus treated polymer, and maintaining the resulting mixture of polyhydroxy phenol and polymer at ordinary temperature and substantially out of contact with light and oxygen to prevent development of peroxides therein prior to feeding said mixture to said isoparaffin alkylation, whereby the yield of desirable alkylation products and the effective life of the catalyst in the alkylation are increased.

2. A process of alkylating an isoparaffin by reaction with an olefin polymer in the presence of an acid alkylation catalyst in the liquid phase which comprises distilling a mixture of olefin polymers containing polymers boiling above about 115° C. and lower boiling polymers to separate therefrom a polymer fraction boiling below about 115° C. characterized by being substantially free from peroxides and a fraction of higher boiling polymer characterized by having a substantial amount of peroxides present therein, feeding said lower boiling polymer to an isoparaffin alkylation unit, treating said fraction of higher boiling peroxide-containing polymer with a reducing agent to substantially reduce the peroxide content thereof, adding a polyhydroxyl phenol to the thus treated polymer, and maintaining the resulting mixture of polyhydroxy phenol and polymer at ordinary temperature and substantially out of contact with light and oxygen to prevent development of peroxides therein prior to feeding said mixture to said isoparaffin alkylation whereby the yield of desirable alkylation products and the effective life of the catalyst in the alkylation are increased.

3. A process of alkylating an isoparaffin by reaction with an olefin polymer in the presence of concentrated sulfuric acid which comprises distilling a mixture of olefin polymers containing polymers boiling above about 115° C. and lower boiling polymers to separate therefrom a polymer fraction boiling below about 115° C. characterized by being substantially free from peroxides and a fraction of higher boiling polymer characterized by having a substantial amount of peroxides present therein, feeding said lower boiling polymer to an isoparaffin alkylation unit, treating said fraction of higher boiling peroxide-containing polymer with sodium bisulfite to substantially reduce the peroxide content thereof, adding sufficient of a polyhydroxy phenol to the thus treated higher boiling polymer to prevent substantial development of peroxides therein during storage prior to alkylation therewith and feeding the resulting mixture of low peroxide content to an isoparaffin alkylation whereby the yield of desirable alkylation products and the effective life of the sulfuric acid catalyst in the alkylation are increased.

4. A process of alkylating isobutane by reaction with butylene polymers in the presence of concentrated sulfuric acid which comprises treating butylene polymers to remove sulfur compounds therefrom, distilling the treated polymer to separate therefrom a polymer fraction boiling below about 115° C. characterized by being substantially free from peroxides and a fraction of higher boiling polymer characterized by having a substantial amount of peroxides present therein, feeding said lower boiling polymer to an alkylation unit, treating said fraction of higher boiling peroxide-containing polymer with sodium bisulfite to substantially reduce the peroxide content thereof, adding sufficient of a polyhydroxy phenol to the thus treated higher boiling polymer to prevent substantial development of peroxides therein during storage prior to alkylation therewith and feeding the resulting mixture of low peroxide content to an isobutane alkylation whereby the yield of desirable alkylation products and the effective life of the sulfuric acid catalyst in the alkylation are increased.

5. A process of alkylating an organic compound by reaction with an olefin polymer in the presence of a liquid alkylation catalyst which comprises treating a mixture of olefin polymers containing sulfur compounds and having polymers boiling above about 115° C. and lower boiling polymers present therein to remove sulfur compounds therefrom, distilling the treated polymer to separate therefrom a polymer fraction boiling below about 115° C. characterized by being substantially free from peroxides and a fraction of higher boiling polymer characterized by having a substantial amount of peroxides present therein, treating said fraction of higher boiling peroxide-containing polymer with a reducing agent to substantially reduce the peroxide content thereof, adding sufficient of an anti-oxidant to the thus treated higher boiling polymer to prevent substantial development of peroxides therein during storage prior to alkylation therewith and contacting the resulting mixture of low peroxide content and an excess of the organic compound to be alkylated with said alkylation catalyst under alkylating conditions whereby the yield of desirable alkylation products and the effective life of the catalyst in the alkylation are increased.

6. A process of alkylating an organic compound by reaction with an olefin polymer in the presence of a liquid alkylation catalyst which comprises distilling a mixture of olefin polymers containing polymers boiling above about 115° C. and lower boiling polyems to separate therefrom a polymer fraction boiling below about 115° C. characterized by being substantially free from peroxides and a fractioin of higher boiling polymer characterized by having a substantial amount of peroxides present therein, treating said fraction of higher boiling peroxide-containing polymer with a reducing agent to substantially reduce the peroxide content thereof, adding sufficient of an anti-oxidant to the thus treated higher boiling polymer to prevent substantial development of peroxides therein during storage prior to alkylation therewith and contacting the resulting mixture of low peroxide content and an excess of the organic compound to be alkylated with said alkylation catalyst under alkylating conditions whereby the yield of desirable alkylation products and the effective life of the catalyst in the alkylation are increased.

ANTON JOHAN TULLENERS.